(12) United States Patent
Yuki et al.

(10) Patent No.: US 11,795,413 B2
(45) Date of Patent: Oct. 24, 2023

(54) VISCOSITY INDEX IMPROVER AND LUBRICANT COMPOSITIONS THEREOF

(71) Applicant: Evonik Operations GmbH, Essen (DE)

(72) Inventors: Tsuyoshi Yuki, Otsu (JP); Tomohiro Matsuda, Tokyo (JP); Yasuo Arai, Ushiku (JP)

(73) Assignee: Evonik Operations GmbH, Essen (DE)

(*) Notice: Subject to any disclaimer, the term of this patent is extended or adjusted under 35 U.S.C. 154(b) by 0 days.

(21) Appl. No.: 17/681,005

(22) Filed: Feb. 25, 2022

(65) Prior Publication Data

US 2022/0306962 A1  Sep. 29, 2022

(30) Foreign Application Priority Data

Mar. 19, 2021 (EP) .................................. 21163685

(51) Int. Cl.
| | | |
|---|---|---|
| C10M 145/14 | (2006.01) | |
| C08F 293/00 | (2006.01) | |
| C10M 169/04 | (2006.01) | |
| C10N 20/04 | (2006.01) | |
| C10N 30/02 | (2006.01) | |

(52) U.S. Cl.
CPC ....... *C10M 145/14* (2013.01); *C08F 293/005* (2013.01); *C10M 169/041* (2013.01); *C10M 2203/003* (2013.01); *C10M 2209/084* (2013.01); *C10N 2020/04* (2013.01); *C10N 2030/02* (2013.01)

(58) Field of Classification Search
CPC ............ C10M 169/041; C10M 107/02; C10M 145/14; C10M 2205/0206; C10M 2209/084; C10M 2205/06; C08F 236/06; C08F 220/1812; C08F 2800/10; C10N 2020/04; C10N 2030/02; C10N 2020/019; C10N 2060/02
See application file for complete search history.

(56) References Cited

U.S. PATENT DOCUMENTS

| | | |
|---|---|---|
| 4,316,973 A | 2/1982 | Kennedy |
| 4,859,210 A | 8/1989 | Franz et al. |
| 6,599,864 B1 | 7/2003 | Bertomeu |
| 8,067,349 B2 | 11/2011 | Stoehr et al. |
| 9,683,195 B2 | 6/2017 | Nakada et al. |
| 9,783,630 B2 | 10/2017 | Stoehr et al. |
| 10,920,164 B2 | 2/2021 | Klein et al. |
| 11,088,528 B2 | 5/2021 | Hagihara et al. |
| 2011/0306533 A1 | 12/2011 | Eisenberg et al. |
| 2011/0319305 A1 | 12/2011 | Eisenberg et al. |
| 2013/0219868 A1* | 8/2013 | Alibert ................ C10M 145/02 508/459 |
| 2016/0097017 A1 | 4/2016 | Eisenberg et al. |
| 2019/0300808 A1* | 10/2019 | Sondjaja ............. C10M 145/32 |

FOREIGN PATENT DOCUMENTS

| | | |
|---|---|---|
| EP | 0 668 342 A1 | 8/1995 |
| EP | 0 776 959 A2 | 6/1997 |
| EP | 1 029 029 A1 | 8/2000 |
| EP | 3 498 808 A1 | 6/2019 |
| GB | 2270317 A | 3/1994 |
| JP | S63-175096 A | 7/1988 |
| JP | 2017031400 A | 2/2017 |
| JP | 2017171899 A | 9/2017 |
| JP | 6234974 B2 | 11/2017 |
| WO | 96/30421 A1 | 10/1996 |
| WO | 97/18247 A1 | 5/1997 |
| WO | 97/21788 A1 | 6/1997 |
| WO | 97/47661 A1 | 12/1997 |
| WO | 98/01478 A1 | 1/1998 |
| WO | 98/40415 A1 | 9/1998 |
| WO | 99/10387 A1 | 3/1999 |
| WO | 99/20720 A1 | 4/1999 |
| WO | 99/41332 A1 | 8/1999 |
| WO | 00/08115 A1 | 2/2000 |
| WO | 00/14179 A1 | 3/2000 |
| WO | 00/14183 A2 | 3/2000 |
| WO | 00/14187 A2 | 3/2000 |
| WO | 00/14188 A2 | 3/2000 |
| WO | 00/15736 A2 | 3/2000 |
| WO | 01/18156 A1 | 3/2001 |
| WO | 01/57166 A1 | 8/2001 |
| WO | 2004/083169 A1 | 9/2004 |
| WO | 2007/003238 A1 | 1/2007 |
| WO | 2009/007147 A1 | 1/2009 |
| WO | 2010/142789 A1 | 12/2010 |

(Continued)

OTHER PUBLICATIONS

Wang et al., J. Am. Chem. Soc, vol. 117, p. 5614-5615 (1995), by Matyjaszewski, Macromolecules, vol. 28, p. 7901-7910 (1995) (10 pages).

(Continued)

*Primary Examiner* — Vishal V Vasisth

(74) *Attorney, Agent, or Firm* — Grüneberg and Myers, PLLC

(57) ABSTRACT

The invention relates to a poly alkyl(meth)acrylate polymer comprising polybutadiene-based monomer units and a process for preparing the same. The invention also relates to the use of said polymer as a viscosity index improver in lubricant formulation and to lubricant compositions comprising said polymer.

19 Claims, No Drawings

(56) References Cited

FOREIGN PATENT DOCUMENTS

| WO | 2013/189951 A1 | 12/2013 |
| WO | 2015/129732 A1 | 9/2015 |
| WO | 2015/139732 A1 | 9/2015 |
| WO | 2018/174188 A1 | 9/2018 |
| WO | 2019/012031 A1 | 1/2019 |

OTHER PUBLICATIONS

European Search Report dated Aug. 16, 2021 in EP21163685.7 (5 pages).
Mang et al. (eds.): "Lubricants and Lubrication", Wiley-VCH, Weinheim 2001; R. M. Mortier, S. T. Orszulik (eds.): "Chemistry and Technology of Lubricants" (3 pages).
Mortier et al., (eds.): "Chemistry and Technology of Lubricants," Springer Science + Business Media, LLC, copyright 1992 (3 pages).
Wang et al., "Controlled/'Living' Radical Polymerization. Atom Transfer Radical Polymerization in the Presence of Transition-Metal Complexes," J. Am. Chem. Soc, Copyright 1995, vol. 117, p. 5614-5615 (2 pages).

\* cited by examiner

VISCOSITY INDEX IMPROVER AND LUBRICANT COMPOSITIONS THEREOF

CROSS REFERENCE TO RELATED APPLICATIONS

This application is a 35 U.S.C. § 119 patent application which claims the benefit of European Application No. 21163685 filed Mar. 19, 2021, which is incorporated herein by reference in its entirety.

FIELD

The invention relates to a poly alkyl(meth)acrylate polymer comprising polybutadiene-based monomer units and a process for preparing the same. The invention also relates to the use of said polymer as a viscosity index improver in lubricant formulation and to lubricant compositions comprising said polymer.

BACKGROUND

The stringent global government vehicle regulations regarding $CO_2$ emissions and fossil fuel consumption force the automotive industry to develop systems that deliver better fuel economy. One lever are hardware changes and the use of lightweight materials. Another lever is the use of lubricants with lower viscosity grades in the transmission or engine. This lever has some limitations as the viscosity has still to be high enough to protect the metal parts in the transmission or engine. Thus, it is important to adjust the viscosity to an optimum and try to keep it as constant as possible over the whole temperature range of the application.

Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, greases and metalworking oils. Lubricants typically contain a base fluid and variable amounts of additives. A wide variety of additives may be combined with the base fluid, depending on the intended use of the lubricant. Examples of lubricant additives include, but are not limited to, viscosity index improvers, thickeners, oxidation inhibitors, corrosion inhibitors, dispersing agents, high pressure additives, anti-foaming agents and metal deactivators.

Polymeric additives are used to thicken the base oil and reduce the change in viscosity with change in temperature. The term Viscosity Index (VI) is used to describe this change in viscosity with temperature. Viscosity index improvers (VIIs) are used to improve the temperature-dependence of the lubricant that is usually illustrated by the viscosity index (VI). The VI is calculated from the kinematic viscosity at 40° C. ($KV_{40}$) and the kinematic viscosity at 100° C. ($KV_{100}$). The higher the VI, the lower is the temperature-dependence of the viscosity of the lubricant, i.e. the viscosity is changing less over temperature. Thus, Viscosity Index Improvers (VII) may be added to a lubricant formulation in order to reach higher VI for lubricant the formulation. The drawback of adding polymeric additives to a lubricant formulation is that these additives will undergo shear stress and will mechanically degrade over time.

Thus, despite the VI, the shear-resistance of the lubricant is an important factor: on one side, the lifetimes of the lubricants are getting longer asking for more resistant lubricants and on the other side the lubricant viscosities are getting lower minimizing the possibility to reduce viscosity due to shear losses without causing any failures in the metal parts.

Polyalkyl(meth)acrylate (PAMA) polymers and especially PAMAs comprising a polybutadiene-based monomer are known to act as good viscosity index improvers in lubricants.

EP3498808A1 describes a polyalkyl(meth)acrylate comprising a combination of polybutadiene-based monomers with different molecular weights and the use of the polymer as a lubricant additive to improve the shear-resistance of the lubricant.

WO2007/003238, WO2009/007147 and WO2010/142789 disclose the use of polymers comprising polybutadiene-derived macromonomers as viscosity index improvers, wherein the macromonomers have a molecular weight of 500 to 50 000 g/mol.

WO2018/174188 discloses polymers comprising polybutadiene-derived macromonomers as viscosity index improvers.

WO2015/129732, JP6234974, JP2017031400, JP2017171899 disclose polymers comprising polybutadiene-derived macromonomers with different molecular weights as viscosity index improvers.

There is still a need to develop new viscosity index improvers which would not only have high viscosity index values but would also have a great shear-resistance in a lubricant formulation. Therefore, the aim of the present invention is to provide viscosity index improvers for use in lubricant compositions with improved viscosity index as compared to the viscosity index improvers known from the prior art, while maintaining good shear-resistance.

SUMMARY

It was surprisingly found that the poly alkyl(meth)acrylate polymer as defined in claim 1 solves the above technical problem as it gives a combination of good shear-stability and high viscosity index in lubricant formulations. By using a polybutadiene-based macromonomer in combination with a high amount of linear or branched propyl(meth)acrylate in the monomer composition, the resulting poly alkyl(meth)acrylate polymer has high viscosity index and good shear-stability when used in a lubricant formulation.

Therefore, in a first aspect, the present invention relates to the poly alkyl(meth)acrylate polymer as defined in claim 1.

In a second aspect, the present invention relates to the method for preparing said poly alkyl(meth)acrylate polymer.

In a third aspect, the present invention relates to the use of the poly alkyl(meth)acrylate polymer according to the invention as an additive for a lubricant composition for improving the viscosity index of the lubricant composition while maintaining good shear-resistance.

In a fourth aspect, the present invention relates to a composition comprising one or more base oil and the poly alkyl(meth)acrylate as defined in the present invention.

DETAILED DESCRIPTION

Polymers of the Invention

In a first aspect, the invention relates to a poly alkyl(meth)acrylate polymer, obtainable by polymerizing a monomer composition comprising:

a) 15 to 35% by weight of one or more polybutadiene-based macromonomer having a number-average molecular weight of 500 to 10,000 g/mol, based on the total weight of the monomer composition, b) 40 to 85% by weight of n-propyl(meth)acrylate, isopropyl(meth)acrylate or a mixture thereof, based on the total weight of the monomer composition, and wherein the poly alkyl(meth)acrylate polymer has a weight-average molecular weight ($M_w$) from 50,000 to 250,000 g/mol.

Unless otherwise noted, the weight amounts of the monomers are given relative to the total amount of monomers used, namely, the total weight of the monomer composition.

Preferably, the amounts of monomers a) and b) in the monomer composition sum up to at least 70% by weight, based on the total weight of the monomer composition, which means that the respective amounts of monomers a) and b) are chosen to sum up to at least 70% by weight, based on the total amount of the monomer composition, the remaining amount corresponding to monomers other than monomers a) and b) and also comprised in the monomer composition. Preferably, the amounts of monomers a) and b) in the monomer composition sum up to 70% to 100% by weight, based on the total weight of the monomer composition.

The polybutadiene-based macromonomers a) of the invention are esters of (meth)acrylic acid, which are either the reaction product of one ester of (meth)acrylic acid with one hydroxylated hydrogenated polybutadiene (by transesterification), or the reaction product of one (meth)acrylic acid with one hydroxylated hydrogenated polybutadiene (by direct esterification).

A polymer in the context of this invention comprises a first polymer, which is also referred to as backbone or main chain, and a multitude of further polymers which are referred to as side chains and are bonded covalently to the backbone. In the present case, the backbone of the polymer is formed by the interlinked unsaturated groups of the mentioned (meth)acrylic acid esters. The alkyl groups and the hydrogenated polybutadiene chains of the (meth)acrylic esters form the side chains of the polymer. The reaction product of one ester of (meth)acrylic acid and one hydroxylated hydrogenated polybutadiene or the reaction product of one (meth)acrylic acid and one hydroxylated hydrogenated polybutadiene corresponds to monomer a) and is also referred in the present invention as macromonomer or polybutadiene-based macromonomer.

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The polymers according to the invention have a weight-average molecular weight ($M_w$) from 50,000 to 250,000 g/mol, preferably from 70,000 to 200,000 g/mol, more preferably from 100,000 to 170,000 g/mol, even more preferably from 120,000 to 160,000 g/mol. Polymers having these weight-average molecular weights are especially suited for use in transmission fluids, such as automatic transmission fluids, manual transmission fluids and belt-continuously variable transmission fluids.

Preferably, the polydispersity index (PDI) of the polymers according to the invention is in the range from 2.5 to 5.0, more preferably from 3.0 to 4.5, even more preferably from 3.2 to 4.2. The polydispersity index is defined as the ratio of weight-average molecular weight to number-average molecular weight (Mw/Mn).

In the present invention, the weight-average molecular weights (Mw) of the polymers are determined by gel permeation chromatography (GPC) using polymethylmethacrylate calibration standards using the following measurement conditions:

Eluent: tetrahydrofuran (THF)
Operation temperature: 40° C.
Column: the column set consists of four columns: PSS-SDV 100 Å 10 μm 8.0×50 mm, PSS-SDV Linear XL 10 μm 8.0×300 mm*2, PSS-SDV 100 Å 10 μm 8.0×300 mm, all columns with an average particle size of 10 μm.
Flow rate: 1 mL/min
Injected volume: 100 μL
Instrument: Shodex GPC101 consisting of an autosampler, pump and column oven Detection device: a refractive index detector from Shodex.

The polymer according to the invention can be characterized on the basis of its molar degree of branching ("f-branch"). The molar degree of branching refers to the percentage in mol % of macromonomer (monomer a)) used, based on the total molar amount of all the monomers in the monomer composition. The molar amount of the macromonomer used is calculated on the basis of the number-average molecular weight $M_n$ of the macromonomer. The calculation of the molar degree of branching is described in detail in WO 2007/003238 A1, especially on pages 13 and 14, to which reference is made here explicitly.

Preferably, the polymers have a molar degree of branching $f_{branch}$ of 0.1 to 5 mol %, more preferably 1.5 to 4 mol % and most preferably 1.5 to 2.5 mol %.

Monomer a)

According to the invention, the above-defined monomer composition comprises as monomer a) from 15 to 35% by weight of a polybutadiene-based macromonomer having a number-average molecular weight ($M_n$) of 500 to 10,000 g/mol, based on the total weight of the monomer composition. Preferably, the polybutadiene-based macromonomer a) has a number-average molecular weight ($M_n$) of 500 to 10,000 g/mol, more preferably of 1,000 to 6,000 g/mol, even more preferably from 1,500 to 2,500 g/mol, most preferably from 1,800 to 2,200 g/mol.

The hydroxylated hydrogenated polybutadienes for use in accordance with the invention have a number-average molecular weight $M_n$ from 500 to 10,000 g/mol, preferably from 1,000 to 6,000 g/mol, more preferably from 1,500 to 2,500 g/mol, even more preferably from 1,800 to 2,200 g/mol. Because of their high molecular weight, the hydroxylated hydrogenated polybutadienes can also be referred to as macroalcohols in the context of this invention. The corresponding esters of (meth)acrylic acid can also be referred to as macromonomers in the context of this invention (monomer a)).

The number-average molecular weight $M_n$ of the macromonomer is determined by gel permeation chromatography (GPC) using polybutadiene calibration standards (PSS Standards Service GmbH, Mainz, Germany) according to DIN 55672-1 using the following measurement conditions:

Eluent: tetrahydrofuran (THF) including 0.02M 2-diethylamino ethylamine
Operation temperature: 35° C.
Column: the column set consists of four columns: SDV 106 Å, SDV 104 Å and SDV 103 Å (PSS Standards Service GmbH, Mainz, Germany), all with the size of 300×8 mm and an average particle size of 10 μm
Flow rate: 1 mL/min
Injected volume: 100 μL Instrument: Agilent 1100 series consisting of an autosampler, pump and column oven Detection device: a refractive index detector from Agilent 1260 series.

Preferably, the monomer composition comprises 15 to 30% by weight, more preferably 20 to 30% by weight of a polybutadiene-based macromonomer a) having a number-average molecular weight ($M_n$) of 500 to 10,000 g/mol, preferably from 1,000 to 6,000 g/mol, more preferably from 1,500 to 2,500 g/mol, even more preferably from 1,800 to 2,200 g/mol, based on the total weight of the monomer composition.

Preferably, the hydroxylated hydrogenated polybutadienes have a hydrogenation level of at least 99%. An alternative measure of the hydrogenation level which can be determined on the polymer of the invention is the iodine number. The iodine number refers to the number of grams of iodine which can be added onto 100 g of polymer. Preferably, the polymer of the invention has an iodine number of not more than 5 g of iodine per 100 g of polymer. The iodine number is determined by the Wijs method according to DIN 53241-1:1995-05.

Preferred hydroxylated hydrogenated polybutadienes can be obtained according to GB 2270317.

As used herein, the term "hydroxylated hydrogenated polybutadiene" refers to a hydrogenated polybutadiene that comprises one or more hydroxyl groups. The hydroxylated hydrogenated polybutadiene may further comprise additional structural units, such as polyether groups derived from the addition of alkylene oxides to a polybutadiene or a maleic anhydride group derived from the addition of maleic anhydride to a polybutadiene. These additional structural units may be introduced into the polybutadiene when the polybutadiene is functionalized with hydroxyl groups.

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with an alkylene oxide, such as ethylene oxide or propylene oxide, a hydroxy-functionalized polybutadiene can be prepared. The polybutadiene may also be reacted with more than one alkylene oxide units, resulting in a polyether-polybutadiene block copolymer having a terminal hydroxyl group. The hydroxylated polybutadiene can be hydrogenated in the presence of a suitable transition metal catalyst.

These monohydroxylated hydrogenated polybutadienes can also be selected from products obtained by hydroboration of (co)polymers of having a terminal double bond (e.g. as described in U.S. Pat. No. 4,316,973); maleic anhydride-ene-amino alcohol adducts obtained by an ene reaction between a (co)polymer having a terminal double bond and maleic anhydride with an amino alcohol; and products obtained by hydroformylation of a (co)polymer having a terminal double bond, followed by hydrogenation (e.g. as described in JP Publication No. S63-175096).

The macromonomers a) for use in accordance with the invention can be prepared by transesterification of alkyl (meth)acrylates. Reaction of the alkyl(meth)acrylate with the hydroxylated hydrogenated polybutadiene forms the ester of the invention. Preference is given to using methyl (meth)acrylate or ethyl(meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate ($Ti(OiPr)_4$) or dioctyltin oxide ($Sn(OCt)_2O$). The reaction is an equilibrium reaction. Therefore, the low molecular weight alcohol released is typically removed, for example by distillation.

In addition, the macromonomers can be obtained by a direct esterification proceeding, for example, from (meth) acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

Monomers b)

The monomer composition comprises, as monomer b), 40 to 85% by weight, preferably 45 to 85% by weight, more preferably 45 to 80% by weight, of n-propyl(meth)acrylate, iso-propyl(meth)acrylate or a mixture thereof, based on the total weight of the monomer composition.

In another preferred form of the invention, the monomer composition may further comprise additional co-monomers. These comonomers are described herein below as monomers c), d), e) and f).

Monomers c)

Preferably, the monomer composition comprises additional monomers c), in addition to the monomers a) and b). The monomers c) are selected from the group consisting of methyl (meth)acrylate, butyl (meth)acrylate or a mixture thereof.

In another particularly preferred form of the invention, the monomer composition comprises 0 to 30% by weight, more preferably 0.1 to 30% by weight, even more preferably 1 to 25% by weight, of one or more monomer c) selected from the group consisting of methyl (meth)acrylate, butyl (meth) acrylate or a mixture thereof, based on the total weight of the monomer composition.

Preferably, the amounts of monomers a), b) and c) sum up to 95 to 100% by weight, preferably sum up to 100% by weight, based on the total weight of the monomer composition.

Monomers d)

Preferably, the monomer composition may also further comprise one or more monomers d), which are selected from the group consisting of styrene monomers having from 8 to 17 carbon atoms selected from the group consisting of styrene, substituted styrenes having an alkyl substituent in the side chain, for example alpha-methylstyrene and alpha-ethylstyrene, substituted styrenes having an alkyl substituent on the ring, such as vinyltoluene and para-methylstyrene, halogenated styrenes, for example monochlorostyrenes, dichlorostyrenes, tribromostyrenes and tetrabromostyrenes, nitrostyrene. Particularly preferred monomer d) is styrene.

In another particularly preferred form of the invention, the monomer composition comprises 0 to 25% by weight, more preferably 0.1 to 25% by weight, even more preferably 0.1% to 10% by weight, most preferably 0.1 to 5% by weight, of one or more monomers d), based on the total weight of the monomer composition.

Preferably, the amounts of monomers a), b), c) and d) sum up to 95 to 100% by weight, based on the total weight of the monomer composition.

Monomers e)

In another particularly preferred form of the invention, the monomer composition may further comprise one or more monomers e), which are C7-30 alkyl(meth)acrylates, in addition to the monomers a) and b), and optional monomers c) and d).

Regarding monomer e), the term "C7-30 alkyl(meth) acrylates" refers to esters of (meth)acrylic acid and linear or branched alcohols having 7 to 30 carbon atoms. The term encompasses individual (meth)acrylic esters with an alcohol of a particular length, and likewise mixtures of (meth)acrylic esters with alcohols of different lengths.

Suitable C7-30 alkyl(meth)acrylates include, for example, 2-butyloctyl(meth)acrylate, 2-hexyloctyl(meth)acrylate, decyl(meth)acrylate, 2-butyldecyl(meth)acrylate, 2-hexyldecyl(meth)acrylate, 2-octyldecyl(meth)acrylate, undecyl (meth)acrylate, 5-methylundecyl(meth)acrylate, dodecyl (meth)acrylate, 2-methyldodecyl(meth)acrylate, 2-hexyldodecyl(meth)acrylate, 2-octyldodecyl (meth)acrylate, tridecyl(meth)acrylate, 5-methyltridecyl(meth)acrylate, tetradecyl(meth)acrylate, 2-decyltetradecyl(meth)acrylate, pentadecyl(meth)acrylate, hexadecyl(meth)acrylate, 2-methylhexadecyl(meth)acrylate, 2-dodecylhexadecyl (meth)acrylate, heptadecyl(meth)acrylate, 5-isopropylheptadecyl(meth)acrylate, 4-tert-butyloctadecyl(meth)acrylate, 5-ethyloctadecyl(meth)acrylate, 3-isopropyloctadecyl (meth)acrylate, octadecyl(meth)acrylate, 2-decyloctadecyl (meth)acrylate, 2-tetradecyloctadecyl(meth)acrylate, nonadecyl(meth)acrylate, eicosyl(meth)acrylate, cetyleicosyl (meth)acrylate, stearyleicosyl(meth)acrylate, docosyl(meth) acrylate, eicosyltetratriacontyl(meth)acrylate, 2-decyltetradecyl(meth)acrylate, 2-decyloctadecyl(meth)acrylate, 2-dodecyl-1-hexadecyl(meth)acrylate, 1,2-octyl-1-dodecyl (meth)acrylate, 2-tetradecylocadecyl(meth)acrylate, 1,2-tetradecyl-octadecyl(meth)acrylate and 2-hexadecyl-eicosyl (meth)acrylate, n-tetracosyl(meth)acrylate, n-triacontyl (meth)acrylate and/or n-hexatriacontyl(meth)acrylate.

In another preferred form of the invention, the monomer composition comprises 0 to 15% by weight, preferably 0.1 to 10% by weight, more preferably 0.1 to 5% by weight, even more preferably 1 to 3% by weight, of one or more monomer e) selected from linear or branched $C_7$ to $C_{30}$ alkyl(meth)acrylates, preferably from linear or branched $C_7$ to $C_{22}$ alkyl(meth)acrylates or a mixture thereof, based on the total weight of the monomer composition. Particularly preferred monomers e) are selected from the group consisting of linear or branched $C_{12}$ to $C_{14}$ alkyl(meth)acrylates, linear or branched $C_{16}$ to $C_{18}$ alkyl(meth)acrylates or a mixture thereof.

The term "$C_{12-14}$ alkyl(meth)acrylates" refers to esters of (meth)acrylic acid and linear or branched alcohols having 12 to 14 carbon atoms. The term encompasses individual (meth)acrylic esters with an alcohol of a particular length, and likewise mixtures of (meth)acrylic esters with alcohols of different lengths. The suitable $C_{12-14}$ alkyl(meth)acrylates include, for example, dodecyl methacrylate, 2-methyldodecyl methacrylate, tridecyl methacrylate, 5-methyltridecyl methacrylate and/or tetradecyl methacrylate.

Likewise, the $C_{16-18}$ alkyl(meth)acrylates include, for example, may also independently be selected from the group consisting of hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth) acrylate, eicosyl (meth)acrylate, cetyleicosyl (meth)acrylate, stearyleicosyl (meth)acrylate, docosyl (meth)acrylate, behenyl (meth)acrylate, eicosyltetratriacontyl (meth)acrylate, cycloalkyl (meth)acrylates, 2,4,5-tri-t-butyl-3-vinylcyclohexyl (meth)acrylate, and 2,3,4,5-tetra-t-butylcyclohexyl (meth)acrylate. Particularly preferred $C_{16-18}$ alkyl(meth) acrylates is stearyleicosyl (meth)acrylate.

Preferably, the amounts of monomers a), b), c), d) and e) sum up to 95 to 100% by weight, based on the total weight of the monomer composition.

Monomers f)

In another preferred form of the invention, the monomer composition further comprises one or more monomers f), in addition to the monomers a) to b), and optionally c), d) and e).

Preferably, the monomer composition comprises from 0 to 10% by weight, more preferably 0.1 to 10% by weight, even more preferably 0.1 to 5% by weight, most preferably 0.5 to 3% by weight, of one or more monomer f) selected from the group consisting of vinyl esters having from 1 to 11 carbon atoms in the acyl group, vinyl ethers having from 1 to 10 carbon atoms in the alcohol group, dispersing oxygen- and/or nitrogen-functionalized monomers, heterocyclic (meth)acrylates, heterocyclic vinyl compounds, monomers containing a covalently bonded phosphorous atom, monomers containing epoxy groups and monomers containing halogens, more preferably one or more monomer f) selected from the list consisting of (meth)acrylates of ether alcohols, aminoalkyl (meth)acrylates, aminoalkyl (meth)acrylamides, vinyl monomers containing aromatic groups or a mixture thereof.

Suitable vinyl esters having from 1 to 11 carbon atoms in the acyl group are selected from the group consisting of vinyl formate, vinyl acetate, vinyl propionate, vinyl butyrate; preferably vinyl esters including from 2 to 9, more preferably from 2 to 5 carbon atoms in the acyl group, wherein the acyl group may be linear or branched.

Suitable vinyl ethers having from 1 to 10 carbon atoms in the alcohol group are selected from the group consisting of vinyl methyl ether, vinyl ethyl ether, vinyl propyl ether, vinyl butyl ether; preferably vinyl ethers including from 1 to 8, more preferably from 1 to 4 carbon atoms in the alcohol group, wherein the alcohol group may be linear or branched.

Suitable monomers which are derived from dispersing oxygen- and/or nitrogen-functionalized monomers are selected from the group consisting of aminoalkyl(meth) acrylates, such as N,N-dimethylaminoethyl(meth)acrylate, N,N-dimethylaminopropyl(meth)acrylate, N,N-diethylaminopentyl(meth)acrylate, N,N-dibutylaminohexadecyl(meth) acrylate; aminoalkyl(meth)acrylamides, such as N,N-dimethylaminopropyl(meth)acrylamide; hydroxyalkyl(meth) acrylates, such as 3-hydroxypropyl(meth)acrylate, 3,4-dihydroxybutyl(meth)acrylate, 2-hydroxyethyl(meth) acrylate, 2-hydroxypropyl(meth)acrylate, 2,5-dimethyl-1,6-hexanediol(meth)acrylate, 1,10-decanediol(meth)acrylate, p-hydroxystyrene, vinyl alcohol, alkenols ((methyl)allyl alcohol having 3 to 12 carbon atoms), multivalent (3-8 valent) alcohol (glycerol, pentaerythritol, sorbitol, sorbitan, doglycerides, sugars) ether or meth(acrylate); $C_{1-8}$-alkyloxy-$C_{2-4}$-alkyl(meth)acrylates, such as methoxypropyl (meth)acrylate, methoxybutyl (meth)acrylate, methoxyheptyl(meth)acrylate, methoxyhexyl(meth)acrylate, methoxypentyl(meth)acrylate, methoxyoctyl(meth)acrylate, ethoxyethyl(meth)acrylate, ethoxypropyl(meth)acrylate, ethoxybutyl(meth)acrylate, ethoxyheptyl(meth)acrylate, ethoxyhexyl(meth)acrylate, ethoxypentyl(meth)acrylate, ethoxyoctyl(meth)acrylate, propoxymethyl(meth)acrylate, propoxyethyl(meth)acrylate, propoxypropyl(meth)acrylate, propoxybutyl(meth)acrylate, propoxyheptyl(meth)acrylate, propoxyhexyl(meth)acrylate, propoxypentyl(meth)acrylate, propoxyoctyl(meth)acrylate, butoxymethyl(meth)acrylate, butoxyethyl(meth)acrylate, butoxypropyl(meth)acrylate, butoxybutyl(meth)acrylate, butoxyheptyl(meth)acrylate, butoxyhexyl(meth)acrylate, butoxypentyl(meth)acrylate and butoxyoctyl(meth)acrylate, ethoxyethyl(meth)acrylate and butoxyethyl(meth)acrylate are being preferred.

Suitable heterocyclic (meth)acrylates are selected form the group consisting of 2-(1-imidazolyl)ethyl(meth)acrylate, 2-(4-morpholinyl)ethyl(meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone.

Suitable heterocyclic vinyl compounds are selected from the group consisting of 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

Monomers containing a covalently bonded phosphorous atom are selected from the group consisting of 2-(dimethylphosphato)propyl(meth)acrylate, 2-(ethylenephosphito)propyl (meth)acrylate, dimethylphosphinomethyl(meth)acrylate, dimethylphosphonoethyl(meth)acrylate, diethyl (meth)acryloyl phosphonate, dipropyl(meth)acryloyl phosphate, 2 (dibutylphosphono)ethyl (meth)acrylate, diethylphosphatoethyl(meth)acrylate, 2-(dimethylphosphato)-3-hydroxypropyl (meth)acrylate, 2-(ethylenephosphito)-3-hydroxypropyl(meth)acrylate, 3-(meth)acryloyloxy-2-hydroxypropyl diethyl phosphonate, 3-(meth)acryloyloxy-2-hydroxypropyl dipropyl phosphonate, 3-(dimethylphosphato)-2-hydroxypropyl(meth)acrylate, 3-(ethylenephosphito)-2-hydroxypropyl(meth)acrylate, 2-(meth)acryloyloxy-3-hydroxypropyl diethyl phosphonate, 2-(meth)acryloyloxy-3-hydroxypropyl dipropyl phosphonate and 2-(dibutylphosphono)-3-hydroxypropyl(meth)acrylate.

Suitable monomers f) containing epoxy groups are, for example, glycidyl(meth)acrylate and glycidyl(meth)allyl ether and the like.

Suitable monomers f) containing halogens are, for example, vinyl chloride, vinyl bromide, vinylidene chloride, (meth)allyl chloride and halogenated styrene (dichlorostyrene) and the like.

Particularly preferred monomers f) are (meth)acrylates of ether alcohols, aminoalkyl (meth)acrylates, aminoalkyl (meth)acrylamides or a mixture thereof, more preferably N,N-dimethylaminoethyl(meth)acrylate, N,N-dimethylaminopropyl(meth)acrylamide and N-vinylpyrrolidone.

In another preferred aspect of the invention, the amounts of monomers a), b), c), d), e) and f) sum up to 95 to 100% by weight, based on the total weight of the monomer composition.

Preparation Method

The invention also relates to a method for preparing the above-mentioned polymers, the method comprising the steps of:

(x) providing a monomer composition as described above; and (y) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The ATRP method is known per se. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

Preferably, the monomer composition provided in step (x) is diluted by addition of an oil to provide a reaction mixture. The amount of the monomer composition, i.e. the total amount of monomers, relative to the total weight of the reaction mixture is preferably 20 to 90% by weight, more preferably 40 to 80% by weight, most preferably 50 to 70% by weight.

Preferably, the oil used for diluting the monomer composition is an API Group I, II, III, IV or V oil, or a mixture thereof. Preferably, a Group III oil or a mixture thereof is used to dilute the monomer composition.

Preferably, step (y) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl peroxy-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, the radical initiator is selected from the group consisting of 2,2'-azobis (2-methylbutyronitrile), 2,2-bis (tert-butylperoxy)butane, tert-butylperoxy 2-ethylhexanoate, 1,1-di-tert-butylperoxy-3,3,5-trimethylcyclohexan, tert-butyl peroxybenzoate and tert-butylperoxy-3,5,5-trimethylhexanoat. Particularly preferred initiators are tert-butylperoxy 2-ethylhexanoate and 2,2-bis(tert-butylperoxy) butane.

Preferably, the total amount of radical initiator relative to the total weight of the monomer composition is 0.01 to 5% by weight, more preferably 0.02 to 1% by weight, most preferably 0.05 to 0.5% by weight.

The total amount of radical initiator may be added in a single step or the radical initiator may be added in several steps over the course of the polymerization reaction. Preferably, the radical initiator is added in several steps. For example, a part of the radical initiator may be added to initiate radical polymerization and a second part of the radical initiator may be added 0.5 to 3.5 hours after the initial dosage.

Preferably, step (y) also comprises the addition of a chain transfer agent. Suitable chain transfer agents are especially oil-soluble mercaptans, for example n-dodecyl mercaptan or 2-mercaptoethanol, or else chain transfer agents from the class of the terpenes, for example terpinolene. Particularly preferred is the addition of n-dodecyl mercaptan.

Preferably, the total reaction time of the radical polymerization is 2 to 10 hours, more preferably 3 to 9 hours.

After completion of the radical polymerization, the obtained polymer is preferably further diluted with the above-mentioned oil to the desired viscosity. Preferably, the polymer is diluted to a concentration of 5 to 60% by weight polymer, more preferably 10 to 50% by weight, most preferably 20 to 40% by weight.

Use of the Polymer According to the Invention

The invention also relates to the use of the above-mentioned polyalkyl(meth)acrylate polymer as an additive for a lubricant composition for improving the viscosity index and shear-resistance of the lubricant composition. The polymer of the invention can thereby be used as a viscosity index improver that—is highly soluble in the lubricating oil composition, allows to maintain excellent properties of the lubricating oil composition such as an excellent shear resistance, while providing very high VI to the lubricant composition.

Compositions Comprising the Polymer According to the Invention

The invention also relates to a composition comprising
(i) one or more base oil; and
(ii) one or more of the above-mentioned poly alkyl(meth)acrylate polymer.

The composition may be an additive composition comprising the polymer (ii) according to the invention and one or more base oil (i) as diluent. The additive composition may, for example, be added as a viscosity index improver to lubricants. Typically, the additive composition comprises a relatively high amount of polymer according to the invention.

The composition may also represent a lubricant composition comprising the polymer (ii) according to the invention, one or more base oil (i) and optionally further additives (iii) as discussed below. The lubricant composition may, for example, be used as a transmission fluid or an engine oil. Typically, the lubricant composition comprises a lower amount of polymer according to the invention as compared to the afore-mentioned additive composition.

The concentration of the poly alkyl(meth)acrylate according to the invention in the lubricant (also called treat rate) can thus vary in broad ranges, such as from 0.1 to 99.5% by weight, or from 0.5 to 99.5% by weight.

If the composition is used as an additive composition, the amount of the one or more base oil (component i)) preferably is 0.5 to 80% by weight, more preferably 50 to 80% by weight and the amount of polymer (component ii)) preferably is 20 to 99.5% by weight, more preferably 20 to 50% by weight, based on the total weight of the additive composition, respectively.

If the composition is used as a lubricant composition, the amount of base oil (component i)) is preferably 80 to 99.9% by weight, more preferably 85 to 99.5% by weight, and the amount of polymer (component ii)) is preferably 0.1 to 20% by weight, more preferably 0.5 to 15% by weight of the polymer, based on the total weight of the composition, respectively.

Preferably, the amounts of (i) and (ii) sum up from 95 to 100% by weight.

The polymers of the present invention, additive compositions thereof and the lubricant compositions comprising the polymers according to the invention are favorably used for driving system lubricating oils (such as manual transmission fluids, differential gear oils, automatic transmission fluids and belt-continuously variable transmission fluids, axle fluid formulations, dual clutch transmission fluids, and dedicated hybrid transmission fluids), hydraulic oils (such as hydraulic oils for machinery, power steering oils, shock absorber oils), engine oils (for gasoline engines and for diesel engines) and industrial oil formulations (such as wind turbine).

If the lubricant composition according to the present invention is used as an engine oil, it preferably comprises from 0.5% by weight to 10% by weight, more preferably from 0.5% by weight to 8% by weight of the polymers according to the invention, based on the total weight of the lubricant composition, leading to a kinematic viscosity at 100° C. being in the range from 4 $mm^2$/s to 10 $mm^2$/s according to ASTM D445.

If the lubricant composition of the present invention is used as an automotive gear oil, it preferably comprises from 0.5% by weight to 10% by weight, more preferably from 0.5% by weight to 8% by weight of the polymers according to the invention, based on the total weight of the lubricant composition, leading to a kinematic viscosity at 100° C. being in the range from 2 $mm^2$/s to 15 $mm^2$/s according to ASTM D445.

If the lubricant composition of the present invention is used as an automatic transmission oil, it preferably comprises from 0.5% by weight to 10% by weight, more preferably from 0.5% by weight to 8% by weight of the polymers according to the invention, based on the total weight of the lubricant composition, leading to a kinematic viscosity at 100° C. being in the range from 2 $mm^2$/s to 6 $mm^2$/s according to ASTM D445.

The kinematic viscosity may be measured according to ASTM D445. Preferably, the kinematic viscosity is measured at a temperature of 100° C. and 40° C.

The shear-resistance is preferably evaluated by measuring the lubricant's properties before and after subjecting the lubricant to shearing according to JASO M347. Preferably, shearing is measured using Ultrasonic shear stability tester according to JASO M347-4.5.1 (one-hour method).

The base oil (i) to be used in the composition preferably comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulfur they contain and by their viscosity indices; Group IV are polyalphaolefins; and Group V are all others, including e.g. ester oils. The Table 1 below illustrates these API classifications.

TABLE 1

| Group | Saturates | Sulphur content | Viscosity Index (VI) |
| --- | --- | --- | --- |
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate base oils used to prepare a lubricant composition in accordance with the present invention is preferably in the range of 1 mm²/s to 10 mm²/s, more preferably in the range of 1 mm²/s to 8 mm²/s, even more preferably of 1 mm²/s to 5 mm²/s, according to ASTM D445.

Further base oils which can be used in accordance with the present invention are Group II to III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP0776959, EP0668342, WO97/21788, WO00/15736, WO00/14188, WO00/14187, WO00/14183, WO00/14179, WO00/08115, WO99/41332, EP1029029, WO01/18156, WO01/57166 and WO2013/189951.

Especially for transmission oil formulations, base oils of API Group III and mixtures of different Group III oils are used. In a preferred embodiment, the one or more base oil (i) is an API Group III base oil or a mixture of API Group III base oils.

The lubricant compositions according to the present invention are further characterized by their low kinematic viscosity at temperatures of 40° C. or less. The $KV_{40}$ is preferably below 40 mm²/s, more preferably 20 to 40 mm²/s. The $KV_{40}$ is the kinematic viscosity at 40° C. and may be measured according to ASTM D445.

The lubricant composition preferably has a viscosity index of more than 150, more preferably of more than 180. The viscosity index may be measured according to ASTM D2270.

The lubricant composition preferably is a transmission fluid or an engine oil.

The lubricant composition according to the invention may also contain, as component (iii), further additives selected from the group consisting of friction modifiers, dispersants, defoamers, detergents, antioxidants, pour point depressants, antiwear additives, extreme pressure additives, anticorrosion additives, dyes and mixtures thereof.

Appropriate dispersants include poly(isobutylene) derivatives, for example poly(isobutylene)succinimides (PMSIs), including borated PIBSIs; and ethylene-propylene oligomers having N/O functionalities.

Dispersants (including borated dispersants) are preferably used in an amount of 0 to 5% by weight, based on the total amount of the lubricant composition.

Suitable defoamers are silicone oils, fluorosilicone oils, fluoroalkyl ethers.

The defoaming agent is preferably used in an amount of 0.005 to 0.1% by weight, based on the total amount of the lubricant composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricant composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'-thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl)sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate]. Of those, especially preferred are bis-phenol-based antioxidants and ester group containing phenol-based antioxidants.

The amine-based antioxidants include, for example, monoalkyldiphenylamines such as monooctyldiphenylamine, mononoyldiphenylamine; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine; polyalkyldiphenylamines such as tetrabutyldiphenylamine, tetrahexyldiphenylamine, tetraoctyldiphenylamine, tetranonyldiphenylamine; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricant composition.

The pour-point depressants include ethylene-vinyl acetate copolymers, chlorinated paraffin-naphthalene condensates, chlorinated paraffin-phenol condensates, polyalkyl(meth)acrylates, polyalkylstyrenes. Preferred are polyalkyl(meth)methacrylates having a mass-average molecular weight of from 5.000 to 200.000 g/mol.

The amount of the pour point depressant is preferably from 0.1 to 5% by weight, based on the total amount of the lubricant composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds; sulfur and phosphorus-containing anti-wear agents such as thiophosphites, thiophosphates, thiophosphonates, amine salts or metal salts of those compounds.

The antiwear agent may be present in an amount of 0 to 3% by weight, preferably 0.1 to 1.5% by weight, more preferably 0.5 to 0.9% by weight, based on the total amount of the lubricant composition.

The preferred friction modifiers may include mechanically active compounds, for example molybdenum disulfide, graphite (including fluorinated graphite), poly(trifluorethylene), polyamide, polyimide; compounds which form adsorption layers, for example long-chain carboxylic acids, fatty acid esters, ethers, alcohols, amines, amides, imides; compounds which from layers through tribochemical reactions, for example saturated fatty acids, phosphoric acid and thiophosphoric esters, xanthogenates, sulphurized fatty acids; compounds which form polymer-like layers, for example ethoxylated dicarboxylic acid partial esters, dialkyl phthalates, methacrylates, unsaturated fatty acids, sulphurized olefins and organometallic compounds, for example molybdenum compounds (molybdenum dithiophosphates and molybdenum dithiocarbamates MoDTC) and their combinations with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additives (iii) is up to 20% by weight, more preferably 0.05% to 15% by weight, more preferably 5% to 15% by weight, based on the total weight of the lubricant composition.

Preferably, the amounts of (i) to (iii) sum up from 95 to 100% by weight, preferably sum up to 100% by weight, based on the total weight of the lubricant composition.

EXPERIMENTAL PART

The invention is further illustrated in detail hereinafter with reference to examples and comparative examples, without any intention to limit the scope of the present invention.

Abbreviations $C_1$ AMA $C_1$-alkyl methacrylate=methyl methacrylate (MMA)

$C_{3n}$ AMA n-$C_3$-alkyl methacrylate=n-propyl methacrylate $C_{3i}$ AMA i-$C_3$-alkyl methacrylate=iso-propyl methacrylate $C_4$ AMA $C_4$-alkyl methacrylate=n-butyl methacrylate $C_{12/14}$ AMA $C_{12/14}$-alkyl methacrylate $C_{16/18}$ AMA $C_{16/18}$-alkyl methacrylate CTA chain transfer agent (dodecyl mercaptan)

$f_{branch}$ degree of branching initiator tert-butylperoxy-2-ethylhexanoat $KV_{40}$ kinematic viscosity @40° C., measured according to ASTM D7042

$KV_{100}$ kinematic viscosity @100° C., measured according to ASTM D7042

MA-1 macroalcohol of hydrogenated polybutadiene with methacrylate functionality ($M_n$=2,000 g/mol)

MM-1 macromonomer of hydrogenated polybutadiene with methacrylate functionality ($M_n$=2,000 g/mol)

$M_n$ number-average molecular weight $M_w$ weight-average molecular weight

NB3020 Nexbase®3020, Group II base oil from Neste with a $KV_{100}$ of 2.2 mm$^2$/s OEM original equipment manufacturer PDI polydispersity index, molecular weight distribution calculated via $M_w/M_n$ Vis. loss Viscosity loss % (calculation based on $KV_{100}$ before and after shear according to JASO M347—one-hour method)

VI Viscosity Index, measured according to ASTM D2270

Yubase3 Commercially available API group II base oil from SK Lubricants Co. Ltd. with a $KV_{100}$ of 3.1 mm$^2$/s Test Methods The polymers according to the present invention and comparative examples were characterized with respect to their molecular weight and PDI.

As already indicated above, the weight-average molecular weights (Mw) of the polymers are determined by gel permeation chromatography (GPC) using polymethylmethacrylate calibration standards using the following measurement conditions:

Eluent: tetrahydrofuran (THF)

Operation temperature: 40° C.

Column: the column set consists of four columns: PSS-SDV 100 Å 10 μm 8.0×50 mm, PSS-SDV Linear XL 10 μm 8.0×300 mm*2, PSS-SDV 100 Å 10 μm 8.0×300 mm, all columns with an average particle size of 10 μm Flow rate: 1 mL/min Injected volume: 100 μL Instrument: Shodex GPC101 consisting of an autosampler, pump and column oven Detection device: a refractive index detector from Shodex.

As already indicated above, the number-average molecular weight $M_n$ of the macromonomer is determined by gel permeation chromatography (GPC) using polybutadiene calibration standards (PSS Standards Service GmbH, Mainz, Germany) according to DIN 55672-1 using the following measurement conditions:

Eluent: tetrahydrofuran (THF) including 0.02M 2-diethylamino ethylamine

Operation temperature: 35° C.

Column: the column set consists of four columns: SDV 106 Å, SDV 104 Å and SDV 103 Å (PSS Standards Service GmbH, Mainz, Germany), all with the size of 300×8 mm and an average particle size of 10 μm Flow rate: 1 mL/min Injected volume: 100 μL Instrument: Agilent 1100 series consisting of an autosampler, pump and column oven Detection device: a refractive index detector from Agilent 1260 series.

The lubricant formulations including the polymers according to the present invention and comparative examples were characterized with respect to their viscosity index (VI) according to ASTM D 2270, and kinematic viscosity at 40° C. ($KV_{40}$) and 100° C. ($KV_{100}$) according to ASTM D7042.

To show the shear stability of the lubricant formulations, the viscosity loss (vis loss) was calculated according to JASO M347. The shear-stability was investigated via Sonic shear stability tester according to JASO M347 for 1 h.

Synthesis of Macroalcohols (Hydroxylated Hydrogenated Polybutadiene) MA-1

The macroalcohol was synthesized by anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and 200 bar pressure. After the hydrogenation had ended, the noble metal catalyst was removed, and organic solvent was drawn off under reduced pressure. Table 2 summarizes the characterization data of MA-1.

TABLE 2

Characterization data of used macromonomers.

| | $M_n$ [g/mol] | Hydrogenation level [%] | OH functionality [%] |
|---|---|---|---|
| MA-1 | 2,000 | >99 | >98 |

Synthesis of Macromonomers MM-1.

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohols are dissolved in methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 mL of MMA are distilled off for azeotropic drying. After cooling to 95° C., $LiOCH_3$ is added and the mixture is heated back to reflux. After the reaction time of about 1 hour, the top temperature has fallen to approximately 64° C. because of methanol formation. The methanol/MMA azeotrope formed, is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter). Table 3 summarizes the macroalcohol, MMA and $LiOCH_3$ amounts used for the synthesis of macromonomers MM-1.

TABLE 3

Macroalcohols, MMA and catalyst amounts for the transesterification of the macromonomers.

| Macromonomer | Macroalcohol | amount MMA [g] | amount $LiOCH_3$ [g] |
|---|---|---|---|
| MM-1 | MA-1 | 500 | 1.5 |

Synthesis of Polymers According to the Present Invention

Working examples were prepared in accordance with the invention (examples 1 to 5). In addition, comparative examples (examples 6* to 11*) were prepared (see monomer compositions in Table 4 below).

Process of Working Examples 1-5 and Comparative Examples 6* and 9*-11*

The monomer mixture whose composition is shown in Table 4 is diluted with a 1.3/98.7 mixture of Nexbase 3020 and Hydroseal G232 H ($KV_{100}$ of 1.0 cSt), so that the concentration of monomers in oil is 60 wt %. An apparatus with 4-neck flask and precision glass saber stirrer is initially charged with 50 wt % of the reaction mixture as prepared above. After heating to 90° C. under nitrogen, the percentage amount of 2,2-bis(tert-butylperoxy) butane initiator named in Table 5 is added to the reaction mixture to start the reaction. The same amount of initiator and Hydroseal G232 H are added to the other 50% of the reaction mixture, so that the concentration of monomers in oil is 40 wt %, which is added constantly to the flask over three hours at 90° C. The reaction is maintained at 90° C. and 1 hour after the reaction mixture dosing, 0.2% (relative to the amount of monomers) of 2,2-bis(tert-butylperoxy) butane are added. The reaction mixture is stirred at 90° C. for additional 2 hours and 0.2% (relative to the amount of monomers) of 2,2-bis(tert-butylperoxy) butane are added. diluted to a 35 wt % solution of polymer in oil with Hydroseal G232 H to obtain the final VII (Examples 1-5 and comparative examples 6* and 9*-11*).

Process of Comparative Example 7*

The monomer mixture whose composition is shown in Table 4 is diluted with Nexbase 3020, so that the concentration of monomers in oil is 60 wt %. An apparatus with 4-neck flask and precision glass saber stirrer is initially charged with 50 wt % of the reaction mixture as prepared above. After heating to 90° C. under nitrogen, the percentage amount of 2,2-bis(tert-butylperoxy) butane initiator named in Table 3 is added to the reaction mixture to start the reaction. The same amount of initiator and Nexbase 3020 are added to the other 50% of the reaction mixture, so that the concentration of monomers in oil is 40 wt %, which is added constantly to the flask over three hours at 90° C. The reaction is maintained at 90° C. and 1 hour after the reaction mixture dosing, 0.2% (relative to the amount of monomers) of 2,2-bis(tert-butylperoxy) butane are added. The reaction mixture is stirred at 90° C. for additional 2 hours and 0.2% (relative to the amount of monomers) of 2,2-bis(tert-butylperoxy) butane are added. diluted to a 30 wt % solution of polymer in oil with Nexbase 3020 to obtain the final VII (comparative example 7*).

Process of Comparative Example 8*

An apparatus with 4-neck flask and precision glass saber is charged with the monomer mixture as shown in Table 4 including the complete amount of MM-1 and 50 wt % of the remaining monomers and the polymerization oil NB3020 is added, so that the concentration of monomers in oil is 60 wt %. After heating to 100° C. under nitrogen, the remaining monomer mixture and NB3020 including tert-butylperoxy-2-ethylhexanoat and dodecyl mercaptan is added, so that the concentration of monomers in oil at the end of the reaction is 30 wt %, is added within three hours with constant dosing rate. The reaction is maintained at 100° C. and 0.5 and 3.5 hours after the end of the initiator dosing, 0.2% (relative to the total amount of monomers) of 2,2-bis(tert-butylperoxy) butane are added. The reaction mixture is stirred at 100° C. overnight to obtain the final VII with a concentration of 30 wt % (comparative example 8*).

TABLE 4

Reaction mixtures used to prepare working examples and comparative examples, and molecular weight and PDI of resulting polymers

| | MM-1 [wt %] | $C_{12/14}$ AMA [wt %] | $C_{16/18}$ AMA [wt %] | $C_4$ AMA [wt %] | $C_1$ AMA [wt %] | $C_{3n}$ AMA [wt %] | $C_{3i}$ AMA [wt %] | Styrene [wt %] | $f_{branch}$ | Initiator [%] | CTA [%] | $M_w$ [g/mol] | PDI |
|---|---|---|---|---|---|---|---|---|---|---|---|---|---|
| 1 | 25.5 | — | — | — | — | 74.5 | — | — | 2.1 | 0.18 | 0.1 | 154,000 | 4.0 |
| 2 | 25.0 | — | — | 25.0 | — | — | 50 | — | 2.2 | 0.18 | 0.1 | 143,000 | 3.6 |
| 3 | 25.0 | — | — | 20.0 | 5 | — | 50 | — | 2.1 | 0.18 | 0.1 | 148,000 | 3.9 |
| 4 | 25.0 | — | — | 12.0 | — | — | 60 | 3 | 2.1 | 0.18 | 0.1 | 141,000 | 3.5 |
| 5 | 25.0 | 2.0 | 2.0 | — | — | 71.0 | — | — | 2.2 | 0.18 | 0.1 | 137,000 | 4.0 |
| 6* | 25.0 | — | 5.0 | 55.0 | 14.8 | — | — | 0.2 | 2.2 | 0.18 | 0.14 | 142,000 | 3.4 |
| 7* | 25.0 | — | 5.0 | 55.0 | 14.8 | — | — | 0.2 | 2.2 | 0.18 | 0.14 | 175,000 | 3.2 |
| 8* | 18.0 | 29.1 | — | 10.3 | 42.4 | — | — | 0.2 | 1.6 | 0.3 | 0.1 | 157,000 | 4.2 |
| 9* | 18.0 | 29.1 | — | 10.3 | 42.4 | — | — | 0.2 | 1.6 | 0.18 | 0.1 | 163,000 | 4.0 |
| 10* | 25.0 | 40.0 | — | — | — | — | 35 | — | 2.9 | 0.18 | 0.1 | 141,000 | 4.1 |
| 11* | 25.0 | 17.0 | — | — | 23.0 | — | 35 | — | 2.2 | 0.18 | 0.1 | 145,000 | 4.1 |

*comparative examples

Evaluation of VI Improver Candidates

To demonstrate the improved effect in shear-resistance of the polymers synthesized with $C_{3n}$ AMA and/or $C_{3i}$ AMA according to the invention, corresponding lubricant formulations comprising polymers in base oil were prepared and the corresponding viscosity losses were determined.

The lubricant formulations A to K were prepared by mixing the components according to Table 5 below. All amounts of components are given in % by weight, based on the total weight of the lubricant composition.

All polymers were blended with an ATF package (at the same fixed treat rate) and an API Group III base oil (Yubase 3). The treat rates of polymer and Yubase 3 were adjusted, so that the $KV_{100}$ of the lubricant formulation is 5.0 cSt. The kinematic viscosity data and viscosity loss of the lubricant formulations are given in Table 5.

As shown in Table 5 below, the inventive polymers according to the present invention exhibit a significantly improved viscosity index compared to the comparative examples, while keeping good level of shear stability of the comparative examples. These results are surprising because an expert in the art would expect that at such high viscosity index values, a shear stability in a lubricant formulation cannot be maintained. Surprisingly, it has been found that the poly alkyl(meth)acrylates according to the invention, comprising high amounts of $C_{3n}$ AMA and/or $C_{3i}$ AMA monomer units, have a desired high viscosity index, while still maintaining good shear stability when mixed in a lubricant formulation.

TABLE 5

Viscometric performance and viscosity loss of lubricant formulations

| | | Working examples | | | | | Comparative examples | | | | | |
|---|---|---|---|---|---|---|---|---|---|---|---|---|
| | | A | B | C | D | E | F | G | H | I | J | K |
| Lubricant | | | | | | | Polymer | | | | | |
| formulation | | 1 | 2 | 3 | 4 | 5 | 6* | 7* | 8* | 9* | 10* | 11* |
| Polymer amount [wt %] | | 14.8 | 10.9 | 12.8 | 12.2 | 13.3 | 11.2 | 11.4 | 17.0 | 15.2 | 6.4 | 13.7 |
| Base oil Yubase 3 [wt %] | | 77.95 | 81.85 | 79.95 | 80.55 | 79.45 | 81.55 | 81.35 | 75.75 | 77.55 | 86.35 | 79.05 |
| ATF package [wt %] | | 7.25 | 7.25 | 7.25 | 7.25 | 7.25 | 7.25 | 7.25 | 7.25 | 7.25 | 7.25 | 7.25 |
| KV40 [mm²/s] | before shear in | 16.34 | 16.15 | 16.32 | 16.28 | 16.39 | 16.62 | 17.79 | 19.07 | 17.31 | 19.22 | 16.81 |
| KV100 [mm²/s] | formulation | 5.011 | 4.971 | 4.966 | 4.972 | 5.006 | 4.987 | 5.006 | 5.002 | 4.960 | 4.996 | 4.987 |
| VI | | 271 | 272 | 266 | 268 | 269 | 261 | 235 | 209 | 241 | 205 | 256 |
| Viscosity loss [%] | shear stability | 6.2 | 9.1 | 6.6 | 6.8 | 7.0 | 9.1 | 8.8 | 4.0 | 5.2 | 15.2 | 7.2 |

The invention claimed is:

1. A poly alkyl(meth)acrylate polymer, obtained by polymerizing a monomer composition comprising:
   a) from 15 to 35% by weight of one or more polybutadiene-based macromonomer a) having a number-average molecular weight of 500 to 10,000 g/mol, based on the total weight of the monomer composition, and
   b) from 45 to 85% by weight of n-propyl(meth)acrylate, iso-propyl(meth)acrylate or a mixture thereof, based on the total weight of the monomer composition,
   wherein the poly alkyl(meth)acrylate polymer has a weight-average molecular weight (Mw) from 50,000 to 250,000 g/mol, and
   wherein the polybutadiene-based macromonomer a) is a hydrogenated polybutadiene with methacrylate functionality, having a number-average molecular weight of from 1,000 to 6,000 g/mol.

2. The poly alkyl(meth)acrylate polymer according to claim 1, wherein the poly alkyl(meth)acrylate polymer has a weight-average molecular weight (M/w) from 70,000 to 200,000 g/mol.

3. The poly alkyl(meth)acrylate polymer according to claim 1, wherein the amounts of monomers a) and b) sum up to at least 70% by weight, based on the total weight of the monomer composition.

4. The poly alkyl(meth)acrylate polymer according to claim 1, wherein the monomer composition further comprises from 0 to 30% by weight of one or more monomer c) selected from the group consisting of methyl (meth)acrylate, butyl (meth)acrylate or a mixture thereof, based on the total weight of the monomer composition.

5. The poly alkyl(meth)acrylate polymer according to claim 1, wherein the monomer composition further comprises from 0 to 30% by weight of one or more monomer d) having from 8 to 17 carbon atoms selected from a group consisting of styrene or a substituted styrene, having an alkyl substituent in the side chain.

6. The poly alkyl(meth)acrylate polymer according to claim 1, wherein the monomer composition further comprises from 0 to 15% by weight of one or more monomer e) selected from linear or branched $C_7$ to $C_{30}$ alkyl(meth)acrylates, preferably from linear or branched $C_7$ to $C_{22}$ alkyl(meth)acrylates or a mixture thereof, based on the total weight of the monomer composition.

7. The poly alkyl(meth)acrylate polymer according to claim 1, wherein the monomer composition further comprises from 0 to 10% by weight of one or more monomer f) selected from the group consisting of (meth)acrylates of ether alcohols, aminoalkyl (meth)acrylates, aminoalkyl (meth)acrylamides or a mixture thereof.

8. The poly alkyl(meth)acrylate polymer according to claim 1, wherein the amounts of monomers a), b), c), d), e) and f) sum up to from 95 to 100% by weight, based on the total weight of the monomer composition.

9. The poly alkyl(meth)acrylate polymer according to claim 1, wherein the poly alkyl(meth)acrylate polymer has a degree of polydispersity from 2.5 to 5.0.

10. A method for preparing a poly alkyl(meth)acrylate polymer, the method comprising the steps of:
    (x) providing a monomer composition according to claim 1, and
    (y) initiating radical polymerization in the monomer composition.

11. A composition comprising:
    (i) one or more base oil, and
    (ii) one or more poly alkyl(meth)acrylate polymer according to claim 1.

12. The composition according to claim 11, wherein the one or more base oil has a kinematic viscosity $KV_{100}$ of from 1.0 $mm^2/s$ to 5.0 $mm^2/s$ according to ASTM D445.

13. The composition according to claim 11, wherein the composition is a lubricant composition comprising from 80 to 99.9% by weight of one or more base oil (i), and from 0.1 to 20% by weight of the poly alkyl(meth)acrylate polymer (ii), based on the total weight of the composition.

14. A lubricant additive comprising the poly alkyl(meth)acrylate polymer according to claim 1.

15. The poly alkyl(meth)acrylate polymer according to claim 1, wherein the poly alkyl(meth)acrylate polymer has a weight-average molecular weight (Mw) from 100,000 to 170,000 g/mol.

16. The poly alkyl(meth)acrylate polymer according to claim 1, wherein the polybutadiene-based macromonomer a) has a number-average molecular weight of from 1,800 to 2,200 g/mol.

17. The poly alkyl(meth)acrylate polymer according to claim 1, wherein the monomer composition further comprises from 0.1 to 25% by weight of one or more monomer c) selected from the group consisting of methyl (meth)acrylate, butyl (meth)acrylate or a mixture thereof, based on the total weight of the monomer composition.

18. The poly alkyl(meth)acrylate polymer according to claim 1, wherein the monomer composition further comprises from 0.1 to 25% by weight of one or more monomer d) having from 8 to 17 carbon atoms selected from a group consisting of styrene or a substituted styrene having an alkyl substituent in the side chain.

19. The poly alkyl(meth)acrylate polymer according to claim 1, wherein the monomer composition further comprises from 0.1 to 10% by weight, of one or more monomer e) selected from linear or branched $C_7$ to $C_{30}$ alkyl(meth)acrylates, preferably from linear or branched $C_7$ to $C_{22}$ alkyl(meth)acrylates or a mixture thereof, based on the total weight of the monomer composition.

* * * * *